United States Patent [19]

Saeda et al.

[11] Patent Number: 5,156,382
[45] Date of Patent: Oct. 20, 1992

[54] WORKPIECE SUPPORT HAVING LOCKING MECHANISM

[75] Inventors: Koichi Saeda, Higashiosaka; Shunji Sakura, Kyoto; Tatsuya Hirai, Itami, all of Japan

[73] Assignee: Tsubakimoto Chain Co., Osaka, Japan

[21] Appl. No.: 773,123

[22] Filed: Oct. 8, 1991

[30] Foreign Application Priority Data

Oct. 9, 1990 [JP] Japan .............. 2-105638[U]

[51] Int. Cl.$^5$ ............................................. B23Q 1/04
[52] U.S. Cl. .................................... 269/71; 269/76; 269/77
[58] Field of Search ............... 269/71, 75, 76, 79, 269/78, 73

[56] References Cited

U.S. PATENT DOCUMENTS

| | | | |
|---|---|---|---|
| 1,225,301 | 5/1917 | Wolfe | 269/77 |
| 2,513,027 | 6/1950 | Kruczek | 269/75 |
| 2,538,640 | 1/1951 | Click | 269/71 |
| 2,898,068 | 8/1959 | Warren | 269/75 |
| 3,661,376 | 5/1972 | Hill et al. | 269/76 |

Primary Examiner—Robert C. Watson
Attorney, Agent, or Firm—Howson & Howson

[57] ABSTRACT

In a workpiece support, a servomotor, a right-angle speed reducer and a work gripping device are supported on a horizontal shaft which is rotatable on bearings in a frame to tilt the axis of rotation of the workpiece. The shaft is locked against rotation by a lever-operated screw, which exerts a lateral force on the shaft through a lock ring. The lock ring is held against rotation by a pin which is fixed to the frame and which extends into a hole in the lock ring along an axis parallel to the axis of the screw. Fixing the lock ring against rotation prevents unintended movement of the shaft caused by tightening of the lever-operated screw. The inner surface of the lock ring is provided with an axial extending V-shaped groove which engages a spacer ring fixed on the shaft along two lines of contact for secure locking of the shaft against rotation.

8 Claims, 9 Drawing Sheets

WORKPIECE SUPPORT HAVING LOCKING MECHANISM

BRIEF SUMMARY OF THE INVENTION

This invention relates to workpiece supports for machine tools, and more particularly to an workpiece support having a workpiece holder rotatable on a tiltable axis, with an improved locking mechanism for fixing the axis of rotation of the workpiece at a selected inclination.

Tilting axis, rotating workpiece supports of the type to which the invention relates, are especially adapted for use with laser beam machine tools.

A typical workpiece support for a laser beam machine tool comprises a frame, a shaft supported in the frame and rotatable about a first, typically horizontal axis, and a motor-driven chuck supported by the shaft for holding a workpiece and rotating the workpiece about a second axis transverse to the first axis. The second axis can be tilted by adjusting the rotational position of said shaft. A locking mechanism, for locking the shaft against rotation relative to the frame, typically includes a lever-operated screw for applying a lateral force to the shaft. The second axis can be tilted to selected positions, and held in those positions by operation of the lever-operated screw. A typical locking mechanism includes a spacer ring fixed to and surrounding the shaft. The tip of the lever-operated screw applies a lateral force to the spacer ring in a direction transverse to the first axis, to lock the shaft frictionally against rotation.

The locking mechanism allows the axis of rotation of the workpiece to be tilted to and held at a desired angle for laser machining.

With the conventional locking mechanism, as described above, the tip of the lever-operated screw tends to dig into the surface of the spacer ring after repeated locking operations, forming scratches which can extend, in the circumferential direction, either partly or entirely around the outer surface of the spacer ring. The entry of the tip of the locking screw into these scratches can result in small, unintended angular movements of the shaft during the locking operation. Furthermore, the scratches in the outer surface of the spacer ring can allow unintended angular movements of the shaft even when the shaft is supposed to be locked against rotation.

The principal objects of the invention are to provide a tilting-axis, rotating workpiece support which avoids unintended tilting movements resulting from operation of its lock lever, and in which the inclination of the axis of rotation of the workpiece is easily adjusted by loosening of the lock lever, but securely and accurately fixed when the lock lever is tightened.

The workpiece support in accordance with the invention comprises a frame, a shaft supported in the frame and rotatable therein about a first axis, and means, for example a chuck, supported by the shaft, for holding a workpiece and rotating the workpiece about a second axis transverse to the first axis, so that the second axis is tiltable by rotation of the shaft. It also comprises locking means for locking the shaft against rotation relative to the frame, whereby the second axis can be tilted to, and held in, selected positions. The locking means comprises a spacer ring surrounding and fixed to the shaft, and means, such as a lever-operated screw, for selectably applying a lateral force to the spacer ring, in a direction transverse to the first axis, to lock the shaft frictionally against rotation. As in the case of prior lockable, tilting workpiece supports, the shaft can be freely rotatable about the first axis when the lateral force is not applied. The workpiece support of the invention differs from prior workpiece supports principally in that it includes a lock ring surrounding the spacer ring and located between the spacer ring and the lateral force-applying means, whereby the lateral force is applied to the spacer ring through the lock ring, and also includes means for fixing the lock ring against rotation relative to the frame regardless of whether or not the lateral force is applied to the spacer ring. In the preferred embodiment, the means for fixing the lock ring against rotation comprises a pin fixed to the frame. This pin is preferably located on the side of the spacer ring opposite to the lateral force-applying means, and extends perpendicular to the first axis, being aligned with the direction of the lateral force and closely fitting a hole in the lock ring.

In the preferred embodiment of the invention, the lock ring has an inner surface with a groove having a V-shaped cross-section. This groove extends parallel to the first axis and is located between the force-applying means and the spacer ring.

In the operation of the locking means, a lateral force is applied to the shaft through the lock ring and the spacer ring so that the shaft is locked against rotation with respect to the frame. Since the lock ring is at all times fixed against rotation, it cannot be rotated by operation of the lever-operated screw. Furthermore, since the screw always operates against the same area on the outer surface of the lock ring, unintended slippage of the shaft, when the shaft is supposed to be locked, is avoided.

DETAILED DESCRIPTION

FIGS. 1-4 show a workpiece support generally designated by reference numeral 12. The support is adapted to be installed on the table of a laser beam machine tool, and comprises a frame 21, a speed reduction unit 22, a servomotor 23, a workpiece gripping and rotating device 24, and an inclination setting mechanism 25.

Figure 3:
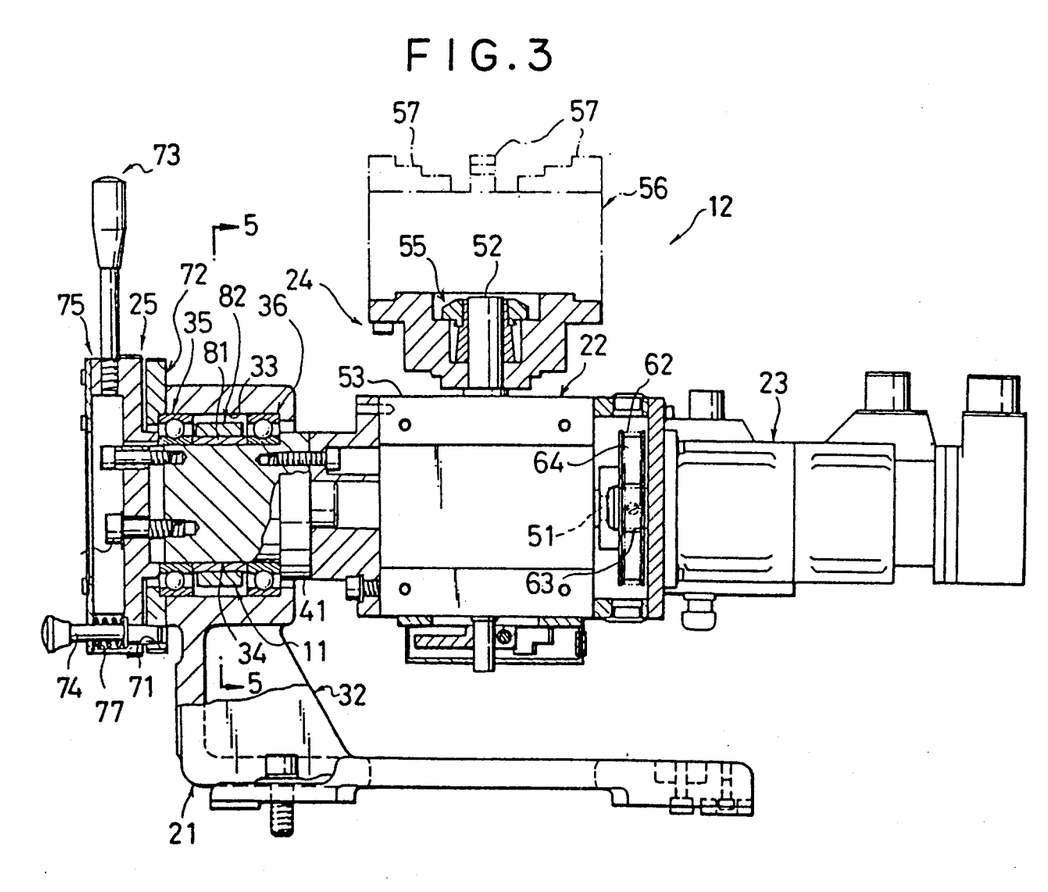
FIG. 3 is an elevation, partly in section, as viewed from the right side of FIG. 1.

Frame 21, best seen in FIG. 3, is formed in an L-shaped configuration, having a horizontal portion adapted to be secured to the laser machine table, and an upstanding portion 32 having a hole 33, in which a pair of ball bearings 35 and 36 are situated for rotatably supporting a shaft 34.

Speed reduction unit 22 is supported on shaft 34 in cantilever fashion with respect to frame 21, and the workpiece gripping and rotating device 24 is supported on, and rotatably driven by, output shaft 52 of the speed reduction unit. Output shaft 52 is disposed in perpendicular relationship to input shaft 51 of the reduction unit, and in perpendicular relationship to the axis of rotation of shaft 34.

Workpiece gripping and rotating device 24 includes a conventional chuck 56, having stepped jaws 57. The chuck is secured to speed reducer output shaft 52 by a keyless connecting mechanism 55.

Figure 4:
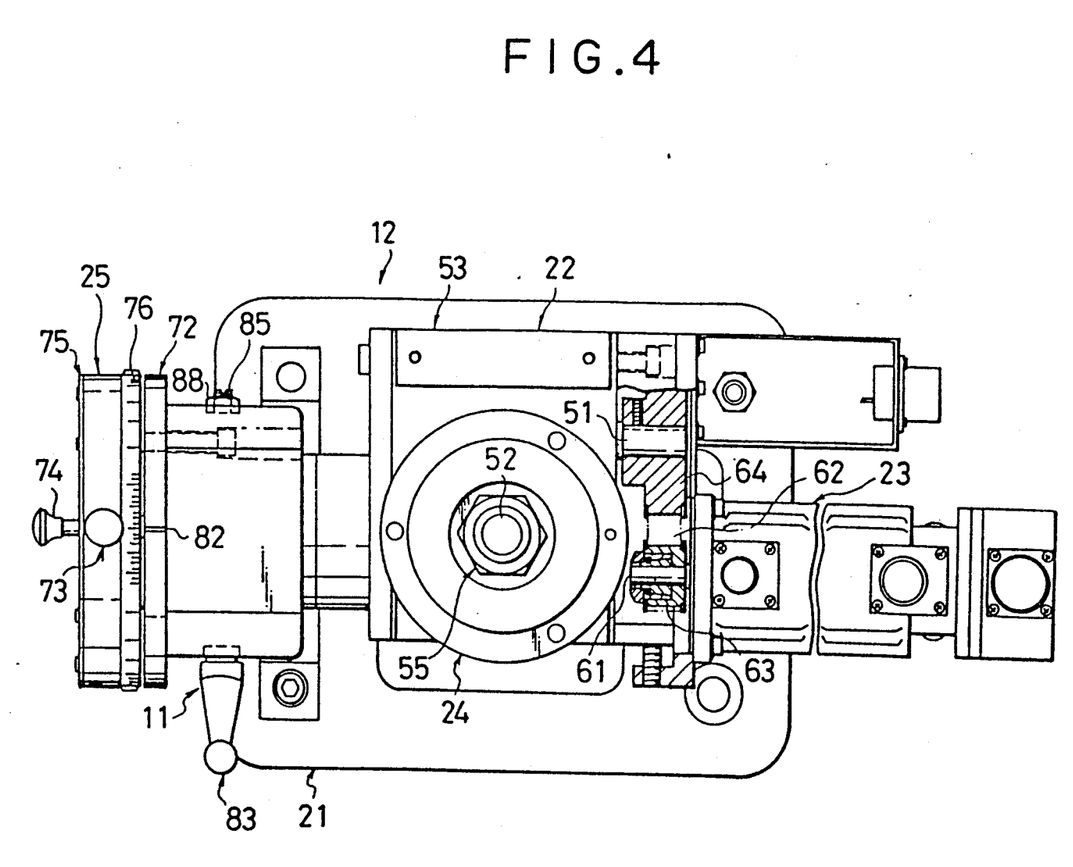
FIG. 4 is a top plan view, also partly in section.

Servomotor 23 is supported on the right side surface of housing 5 of the speed reduction unit (as viewed in FIG. 3). As shown in FIG. 4, input shaft 51 of the speed reduction unit is connected to output shaft 61 of the servomotor through a belt drive consisting of a toothed belt 62 and pulleys 63 and 64.

Preferably, the parts installed on shaft 34, including speed reduction unit 22, servomotor 23, and workpiece gripping and rotating device 24, are situated so that their center of gravity substantially coincides with the axis of rotation of shaft 34.

An inclination setting mechanism 25 is provided on the upstanding portion 32 of frame 21, and comprises a plate 72 and an edge plate 75, the latter being secured to the left end of shaft 34 and having a lever 73 through which shaft 34 can be rotated. Plate 72 has a hole 71 near its periphery, as shown in FIG. 3, and, in a typical plate, four such holes are provided, disposed at angular intervals of 90°, all at a uniform radial distance from the axis of shaft 34. Plate 75 is provided with a pin 74 selectively engageable with any of the holes in plate 72 corresponding to hole 71. Pin 74 is continuously urged toward plate 72 by spring 77 (FIG. 3). The tip of pin 74 is preferably tapered, and hole 71, and its corresponding holes (not shown), are correspondingly tapered so as to receive and closely fit the tip of pin 74.

The outer surface of plate 75 is provided with angle markings 76, which are readable against groove 82 formed in the periphery of plate 72, as shown in FIG. 4. Preferably, there are four such grooves in plate 72, disposed at 90° intervals on the periphery of plate 72.

Plate 72 and plate 75, as shown in FIG. 3 respectively press axially against the outer and inner races of bearing 35. In addition, the axial force applied to the inner race of bearing 35, directly by plate 75 and indirectly by plate 72, is transferred through spacer ring 81 to the inner race of bearing 36. This force directly presses the inner race of bearing 36 against a larger diameter part 41 of shaft 34, and indirectly presses the outer race against a shoulder formed in hole 33, thereby eliminating axial play in the bearings.

In the operation of the workpiece support 12, a workpiece W (see FIG. 1) is gripped by chuck 56. When servomotor 23 is operated, rotational force is transmitted, through motor output shaft 61, pulley 63, belt 62 and pulley 64, to the input shaft of speed reduction unit 22. Output shaft 52 rotates workpiece gripping and rotating device 24, causing the workpiece W to rotate in a horizontal plane, provided the apparatus is in the condition shown in FIG. 3. Because of the speed reduction effected by reducing unit 22 and by the belt and pulley drive mechanism, the workpiece rotates at a speed which is a fraction of the speed of rotation of the servomotor.

Figure 1:
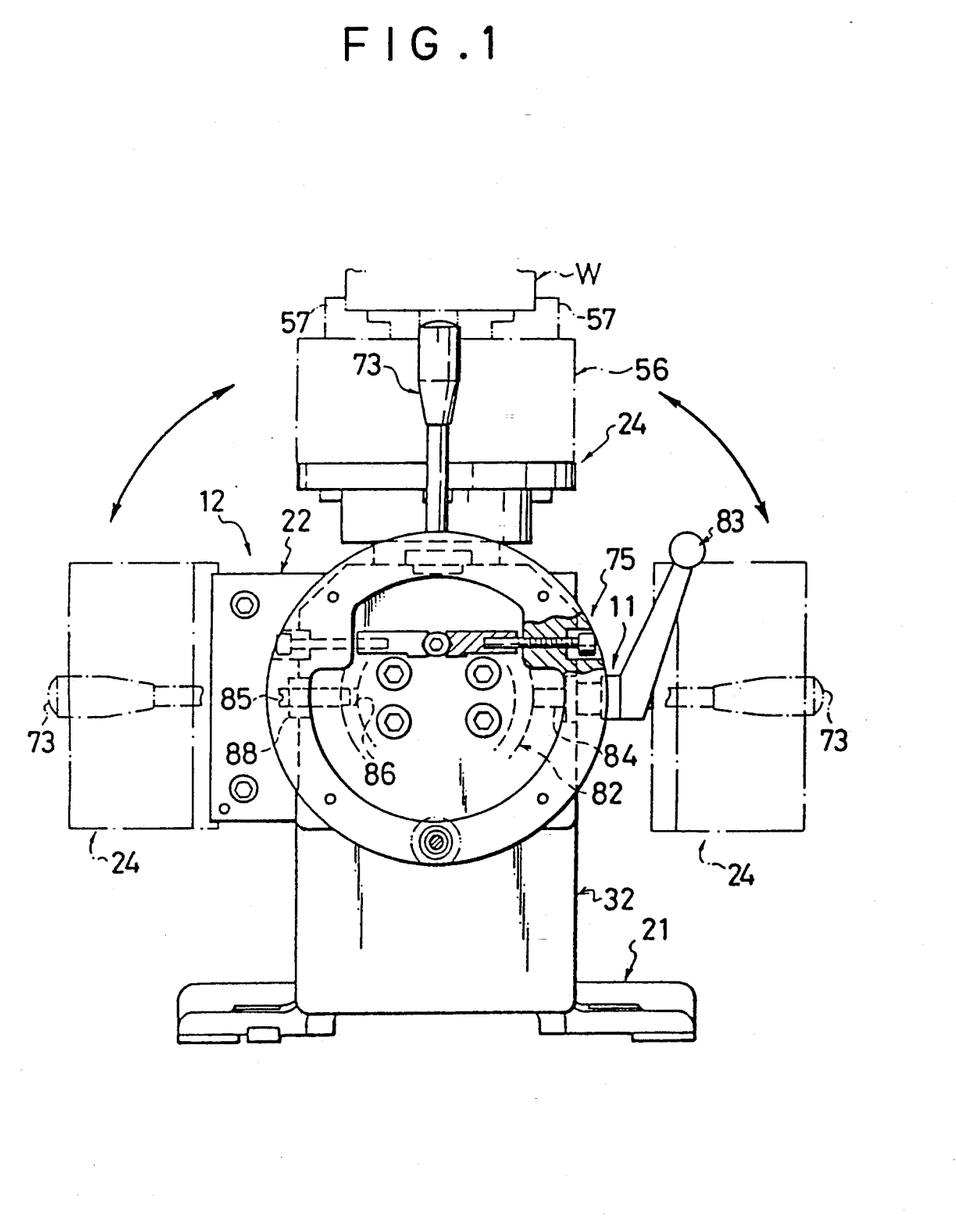
FIG. 1 is a front elevation, partly in section, showing a workpiece support in accordance with the invention.
Figure 2:
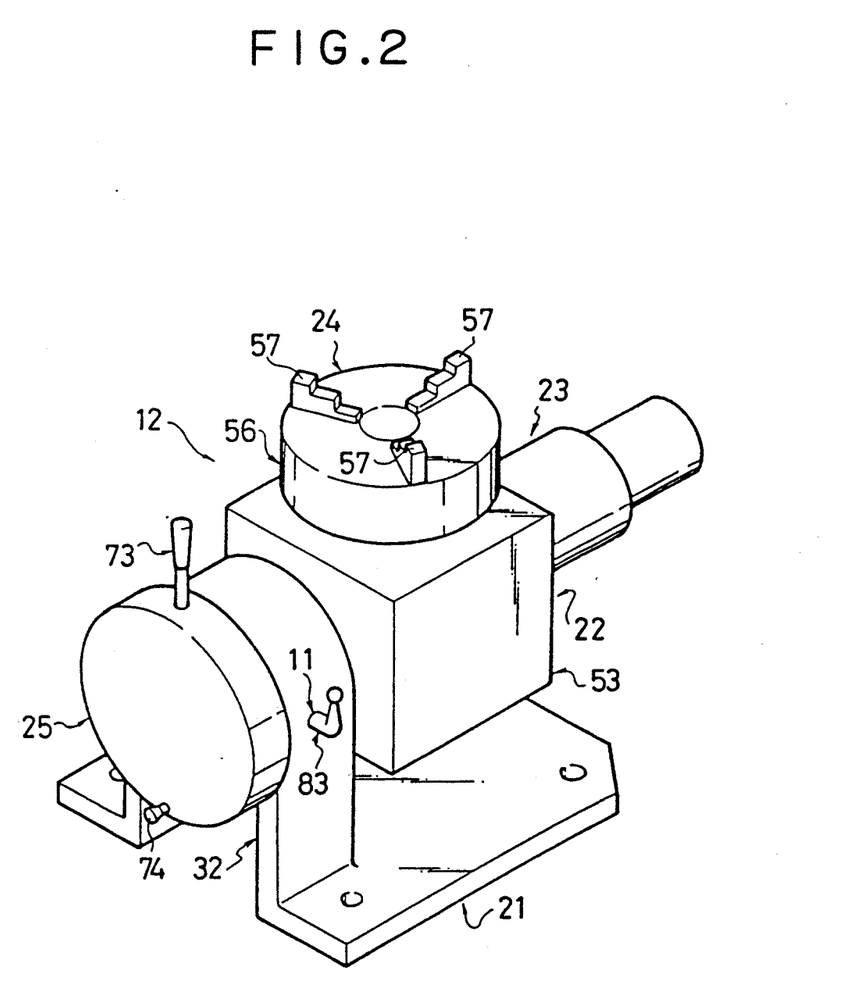
FIG. 2 is a perspective schematic view of the workpiece support.

When pin 74 is manually pulled out from hole 71 against the force exerted by spring 77, lever 73 can be moved manually to rotate shaft 34, thereby causing the workpiece gripping and rotating device, the servomotor and the speed reduction unit to tilt together. This results in the tilting of the axis of rotation of the workpiece gripping and rotating device. By selectively engaging pin 74 with one of the several holes (corresponding to hole 71) in plate 72, the axis of rotation of the workpiece can be positioned either vertically, or 90° on either side of vertical, as shown in FIG. 1. Thus, the apparatus enables the axis of rotation of the workpiece to be tilted, as required for laser processing of the workpiece, and holds the axis of rotation of the workpiece in the selected position while rotation of the workpiece takes place.

Figure 5:
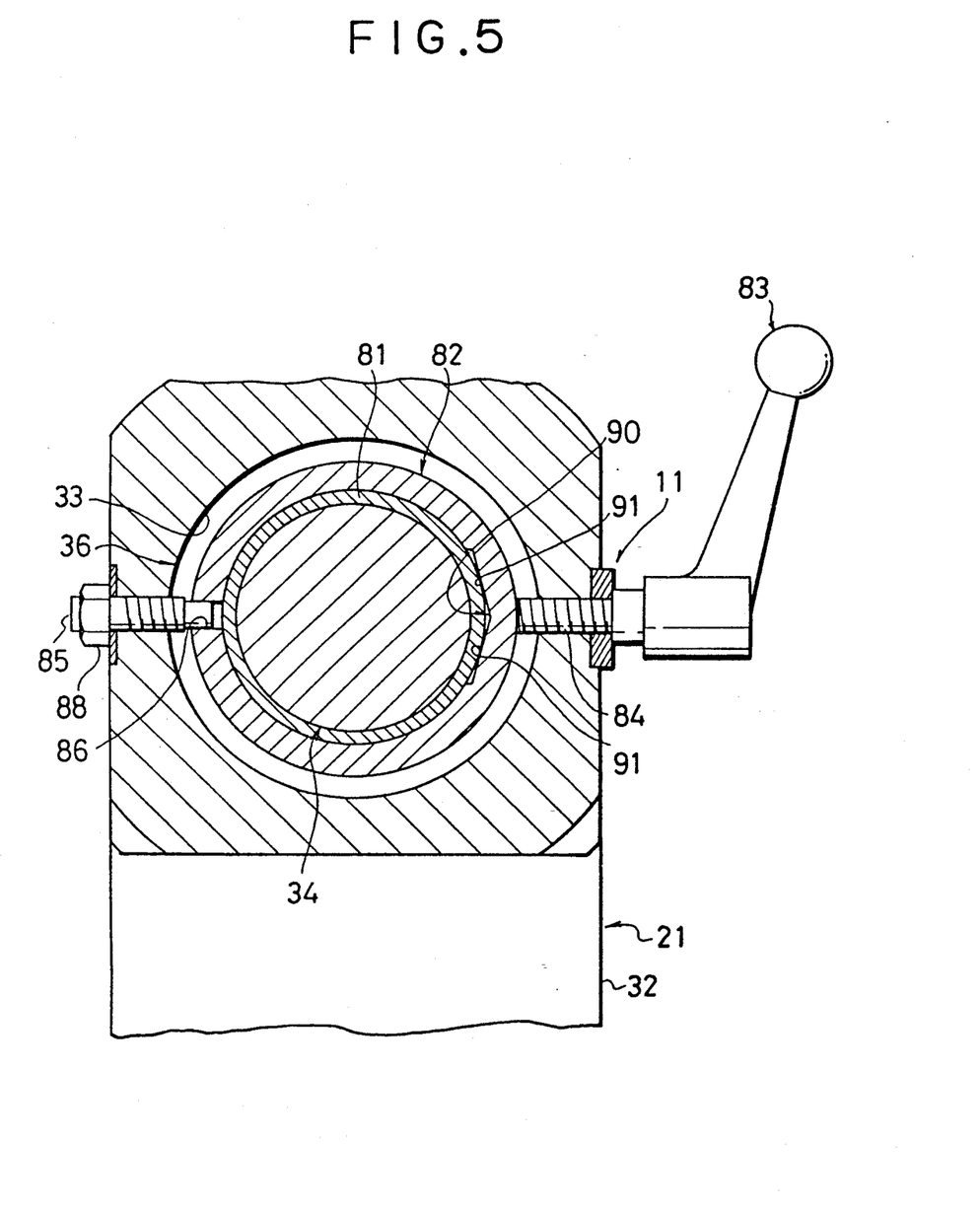
FIG. 5 is a vertical section taken on radial plane 5—5 of FIG. 3.
Figure 6:
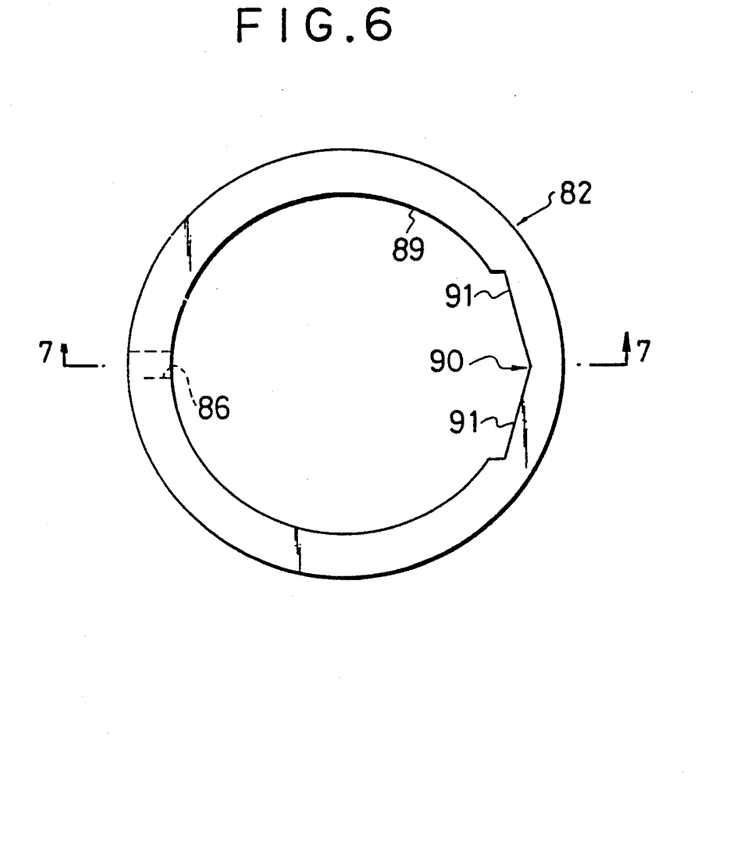
FIG. 6 is an elevation of the lock ring.
Figure 7:
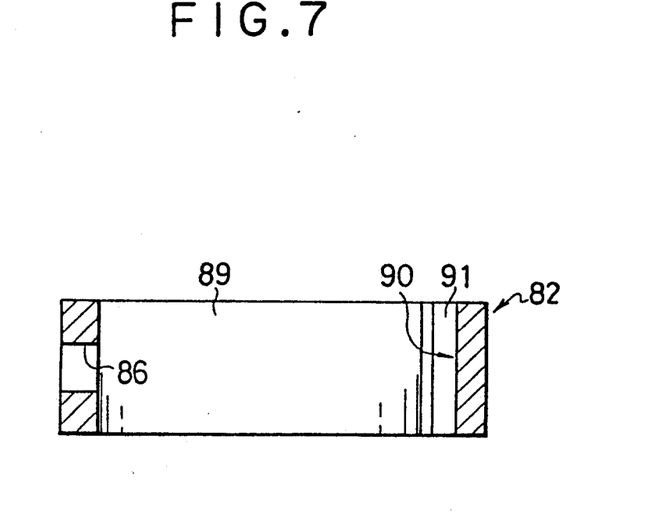
FIG. 7 is a section taken on axial plane 7—7 of FIG. 6.

Referring now to FIGS. 5-7, in order to maintain shaft 34 firmly locked against rotation, a locking mechanism 11 is provided. The locking mechanism comprises spacer ring 81 (see also FIG. 3), a lock ring 82, a lever 83, and a screw 84 operated by lever 83.

The spacer ring is integrally fixed to shaft 34 so that, when it is locked against rotation, the shaft cannot rotate. Lever 83 is located to the side of upstanding frame portion 32, and is fixed to screw 84, which is threaded into, and extends through, a threaded transverse opening in the frame, as shown in FIG. 5.

A pin 85, which is in the form of a bolt, is provided on the side of the frame opposite screw 84, and threaded into the frame so that the tip of pin 85 extends into a radial hole 86 formed in lock ring 82. A nut 88 is threaded onto the pin outside the frame, and presses against the outside of the frame to lock the pin in place. Since pin 85 extends into hole 86 along an axis which parallel to (and preferably aligned with) the axis of screw 84, it allows ring 82 to move radially when it is pushed by screw 84, so that it does not interfere with the locking action of ring 82 against spacer ring 81. At the same time, the engagement of pin 85 with hole 86 prevents ring 82 from rotating, so that screw 84 always engages the same area on the outer surface of ring 82.

On the inner surface 89 (FIGS. 6 and 7) of lock ring 82, there is formed a groove 90, having a V-shaped cross-section which extends parallel to the axis of shaft 34. The V-shaped groove is located on the inner surface of the lock ring at a location directly opposite the location on the outer surface of the lock ring which is engaged by screw 84. As shown in FIG. 3, lock ring 82 is axially shorter than spacer ring 81, so that the lock ring does not contact bearings 35 and 36.

If lever 83 is rotated clockwise (as viewed from the right in FIG. 3), screw 84 is moved inward and presses against lock ring 82. Inclined surfaces 91 of groove 90 press against spacer ring 81, pushing shaft 34 toward the left. The leftward force is transmitted to frame 21 through bearings 35 and 36. Shaft 34 is locked against rotation by the frictional forces generated between the lock ring and the spacer ring, the lock ring being held against rotation by the engagement of pin 85 with hole 86. Therefore, the inclination of the axis of rotation of the workpiece can be set to any angle within a range of more than 90° on either side of vertical.

If lever 83 is rotated counterclockwise, screw 84 moves to the right, thereby releasing the engagement of the lock ring with the spacer ring and allowing rotation of shaft 34.

A similar locking mechanism can be provided on a workpiece support in which the shaft carrying the servomotor, speed reducing unit and workpiece gripping and rotating device is rotated through a second speed reducing unit. A workpiece support of this type is shown in FIGS. 8-11, in which workpiece support 112 is provided with a manually operable wheel 101 which operates a shaft 134 through a speed reducing unit 103.

Except for the elements relating to handwheel 101, the elements of FIGS. 8-11 are the same as those in FIGS. 1-7 and are identified by reference numerals which exceed, by one-hundred, the reference numerals for corresponding elements in FIGS. 1-7.

Figure 8:
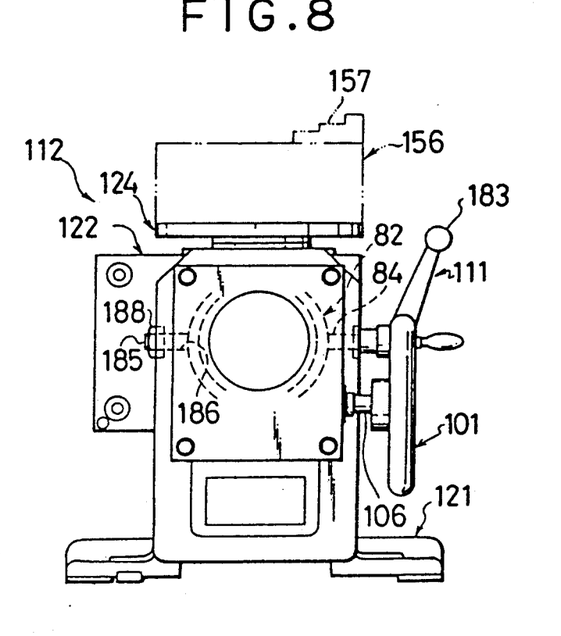
FIG. 8 is a front elevation of an alternative embodiment of the invention, in which the angle of inclination of the axis of rotation of the workpiece is adjusted through a speed reduction unit.
Figure 9:
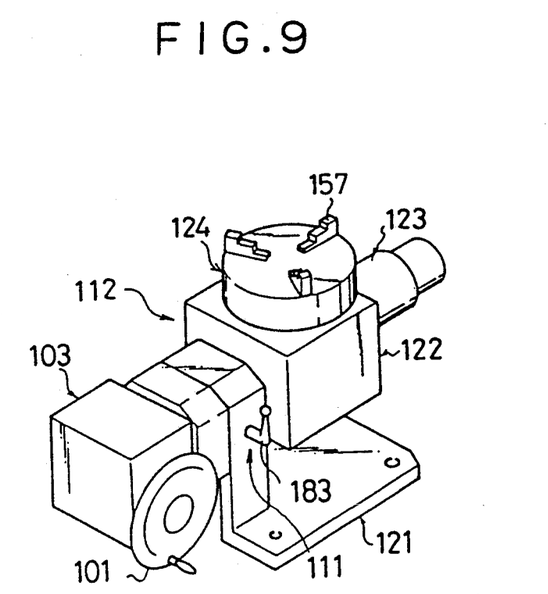
FIG. 9 is a perspective schematic view of the workpiece support of FIG. 8.
Figure 10:
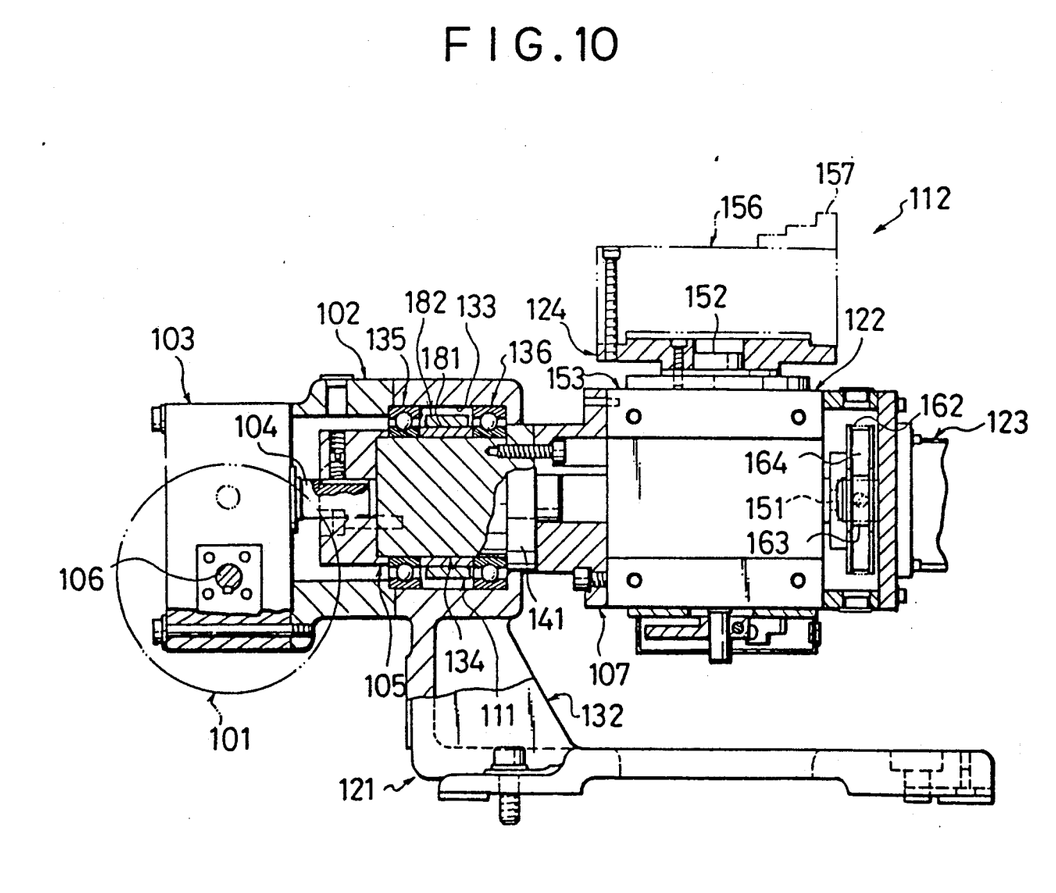
FIG. 10 is an elevation, partly in section, as viewed from the right side of FIG. 9.
Figure 11:
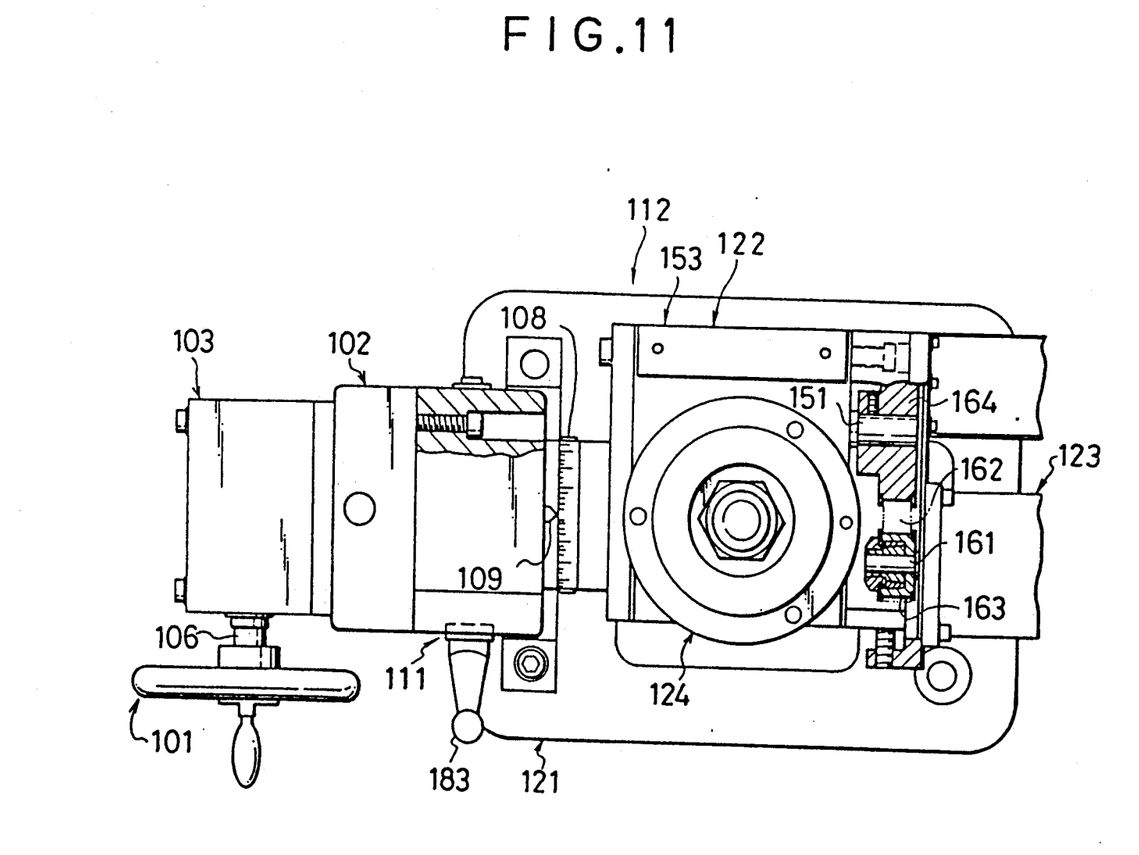
FIG. 11 is a top plan view, also partly in section, of the workpiece support of FIGS. 8-10.

Speed reducing unit 103 is supported on the upstanding portion 132 of frame 121 by a bracket 102. Speed reducing unit 103 has the same structure as that of unit 22 of FIGS. 1-4. Its output shaft 104 is connected with shaft 134 through a connecting member 105, as shown in FIG. 10. Handwheel 101 is provided in input shaft 106 of the reducer unit as shown in FIG. 8. On the outer surface of bracket 107 (FIG. 10), which connects shaft 134 with shaft-carried speed reduction 122, angle markings are provided at 108 (FIG. 11). A pointer 109, against which the angle markings are readable, is provided on frame 121, as shown in FIG. 11.

Lock lever 183 of locking mechanism 111 (FIGS. 8-11) corresponds to lever 83 of locking mechanism 11 in FIGS. 1, 2, 4 and 5. When lever 183 is rotated counterclockwise, shaft 134 is released for rotation, which is effected by manually turning handwheel 101. Because of the speed reduction effected by reducer unit 103, shaft 134 rotates more slowly than handwheel 101. Therefore, the axis of rotation of the workpiece can be accurately adjusted to the desired angle of inclination, and the angle can be read by reading markings 108 against pointer 109. By rotating lever 183 clockwise, shaft 134 can be locked in the desired position with respect to frame 121 so that the workpiece is held at the desired inclination for laser machining.

The invention is superior to prior tiltable rotating workpiece supports in that the lock ring, is fixed against rotation and is always engaged by the tip of screw 84 on the same are on its outer surface. This eliminates unintended rotating movement of the shaft and resulting unintended tilting of the workpiece rotation axis, both when lever 83 is being tightened, and after it is tightened.

The invention is also superior to prior tiltable rotating workpiece supports in that the V-shaped groove on the inner surface of the lock ring provides for contact between the lock ring and the spacer ring along two lines, both of which are parallel to the axis of the shaft. This provides more secure locking of the shaft, and allows the workpiece rotation axis to be accurately adjusted and held firmly at the desired angle.

Various modifications can be made to the apparatus described above. For example, instead of a lever 83, a handle having indentations for receiving the fingers of an operator can be used. Pin 74 (FIG. 3) which is used to lock the workpiece axis of rotation in any one of several discrete positions can be eliminated. Various other modifications can be made to the apparatus described without departing from the scope of the invention as defined in the following claims.

We claim:

1. In a workpiece support for a laser beam machine tool, comprising a frame, a shaft, a pair of bearings spaced along said shaft for rotatable support of said shaft in said frame about a first axis, means, supported by said shaft, for holding a workpiece and rotating the workpiece about a second axis transverse to said first axis, said second axis being tiltable in dependence on the rotational position of said shaft, and locking means for locking said shaft against rotation relative to said frame, whereby said second axis can be tilted to, and held in, selected positions, said locking means comprising a spacer ring disposed completely around said shaft between said bearings and fixed to said shaft for rotation therewith, and means for selectably applying a lateral force to only one side of said spacer ring, in a direction transverse to said first axis, to lock said shaft frictionally against rotation, wherein the improvement comprises a lock ring slidably mounted around said spacer ring for relative rotation therebetween, said lock ring being located between said spacer ring and said lateral force-applying means, whereby said lateral force is applied to said spacer ring through said lock ring, and means at the diametrically opposite side of said spacer ring for fixing said lock ring against rotation relative to said frame regardless of whether or not said lateral force is applied to said spacer ring.

2. A workpiece support according to claim 1 in which said lock ring has an inner surface with a groove having a V-shaped cross-section, said groove having sides extending parallel to said first axis for tangentially engaging the facing surfaces of said shaft.

3. An adjustable support comprising a frame, a shaft, bearing means rotatably supporting said shaft in said frame, means providing a cylindrical surface extending completely around said shaft, a lock ring slidably mounted around said cylindrical surface, means for selectably imparting a lateral force to said lock ring whereby said lock ring applies a corresponding lateral force to only one side of said cylindrical surface, for frictionally locking said shaft against rotation in said frame, and means for preventing rotation of said lock ring relative to said frame regardless of whether or not said lateral force is applied to said cylindrical surface.

4. A support according to claim 3 in which said bearing means comprises a pair of bearings, and in which said means providing a cylindrical surface is a spacer ring, located between said bearings, and fixed to said shaft.

5. A support according to claim 3 in which said means for selectably imparting a lateral force to said lock ring comprises a lock screw interengaging said frame with said lock ring.

6. A support according to claim 3 in which said means for preventing rotation of said lock ring relative to said frame comprises interengaging means on said frame and said lock ring, said interengaging means being relatively slidable in a direction parallel to the direction of said lateral force.

7. A support according to claim 3 in which said force-imparting means is located on one side of said lock ring, and in which aid means for preventing rotation of said lock ring relative to said frame comprises relatively slidable interengaging means on said frame and said lock ring, at a location on the side of said lock ring diametrically opposite the location of said force imparting means.

8. A support according to claim 3 further comprising a V-shaped groove formed on the inner surface of said lock ring parallel to said shaft and having sides disposed tangentially of the facing surfaces of said shaft.

* * * * *